(12) United States Patent
Singh et al.

(10) Patent No.: US 11,348,315 B2
(45) Date of Patent: May 31, 2022

(54) GENERATING AND PRESENTING A 3D VIRTUAL SHOPPING ENVIRONMENT

(71) Applicant: Obsess, Inc., New York, NY (US)

(72) Inventors: Neha Singh, New York, NY (US); Ji Dong, New York, NY (US); Grace Barr, New York, NY (US)

(73) Assignee: OBSESS, INC., New York, NY (US)

( * ) Notice: Subject to any disclaimer, the term of this patent is extended or adjusted under 35 U.S.C. 154(b) by 0 days.

(21) Appl. No.: 16/821,044

(22) Filed: Mar. 17, 2020

(65) Prior Publication Data
US 2020/0302693 A1    Sep. 24, 2020

Related U.S. Application Data

(60) Provisional application No. 62/820,540, filed on Mar. 19, 2019.

(51) Int. Cl.
*G06T 19/00* (2011.01)
*G06Q 30/06* (2012.01)

(52) U.S. Cl.
CPC ....... *G06T 19/003* (2013.01); *G06Q 30/0643* (2013.01)

(58) Field of Classification Search
None
See application file for complete search history.

(56) References Cited

U.S. PATENT DOCUMENTS

| | | | |
|---|---|---|---|
| 10,706,624 B1 * | 7/2020 | Chuah | G06T 15/205 |
| 2004/0113818 A1 * | 6/2004 | Yokokohji | G06T 7/70 |
| | | | 340/995.1 |
| 2005/0253840 A1 * | 11/2005 | Kwon | G06Q 30/0603 |
| | | | 345/419 |
| 2017/0061838 A1 * | 3/2017 | Shi | G02B 27/0172 |
| 2017/0078654 A1 * | 3/2017 | Facin | G06F 3/04815 |

(Continued)

OTHER PUBLICATIONS

Speicher, Marco, Sebastian Cucerca, and Antonio Krüger. "VRShop: a mobile interactive virtual reality shopping environment combining the benefits of on-and offline shopping." Proceedings of the ACM on Interactive, Mobile, Wearable and Ubiquitous Technologies 1, No. 3 (Sep. 11, 2017): 1-31. (Year: 2017).*

*Primary Examiner* — Steven Z Elbinger
(74) *Attorney, Agent, or Firm* — Polsinelli PC

(57) ABSTRACT

A computer-implemented method includes: receiving, by a computing device, user-specific parameters for generating a virtual environment customized for a user, wherein the virtual environment includes scenery and one or more products associated with the user; generating, by the computing device, the virtual environment with the one or more products displayed within the scenery; presenting, by the computing device, the virtual environment; receiving, by the computing device, user inputs for navigating through the virtual environment; updating, by the computing device, the presentation of the virtual environment based on the user inputs for navigating through the virtual environment; receiving, by the computing device, user inputs for selecting the one or more products within the virtual environment; presenting, by the computing device, information regarding the one or more products; receiving, by the computing device, user inputs for purchasing the one or more products; and processing a purchase for the one or more products.

20 Claims, 17 Drawing Sheets

(56) References Cited

U.S. PATENT DOCUMENTS

| | | | |
|---|---|---|---|
| 2017/0186232 A1* | 6/2017 | Dange | G06T 19/00 |
| 2017/0301132 A1* | 10/2017 | Dalton | G06T 7/521 |
| 2017/0374344 A1* | 12/2017 | Boulton | H04N 13/398 |
| 2018/0240276 A1* | 8/2018 | He | G06T 3/0087 |
| 2018/0374276 A1* | 12/2018 | Powers | G06T 19/20 |
| 2019/0057487 A1* | 2/2019 | Cheng | G06T 3/0087 |
| 2019/0378341 A1* | 12/2019 | Xie | G06T 19/20 |
| 2020/0160488 A1* | 5/2020 | Van Deventer | G06T 3/0012 |

* cited by examiner

GENERATING AND PRESENTING A 3D VIRTUAL SHOPPING ENVIRONMENT

CROSS-REFERENCE TO RELATED APPLICATIONS

This application claims priority to U.S. Provisional Patent Application, 62/820,540, which was filed on Mar. 19, 2019, and is incorporated herein by reference in its entirety.

BACKGROUND

Online shopping websites mostly all present products in the form of a grid where each product is presented in a table cell or a list. The user can browse products by brand or search for specific products or filter the available product list by different parameters. Further, the user can scroll down through the table, select to browse to the next page and do the same. The product images are presented on a plain webpage background on every website, regardless of the type of product or the brand. Further, products of all varieties and categories are presented in the same size in the grid as the products are all represented as photographs of the same size in a table. For example, a dress might look the same size as a handbag which will look the same size as a bracelet.

A Virtual shop may include images and/or a computer-generated replica of a physical "brick and mortar" store. A virtual shop may be used to allow a consumer to take a virtual tour of the physical store using a user device and application (e.g., desktop/laptop computer, smart phone, tablet, etc.).

DETAILED DESCRIPTION

Figure 1A:
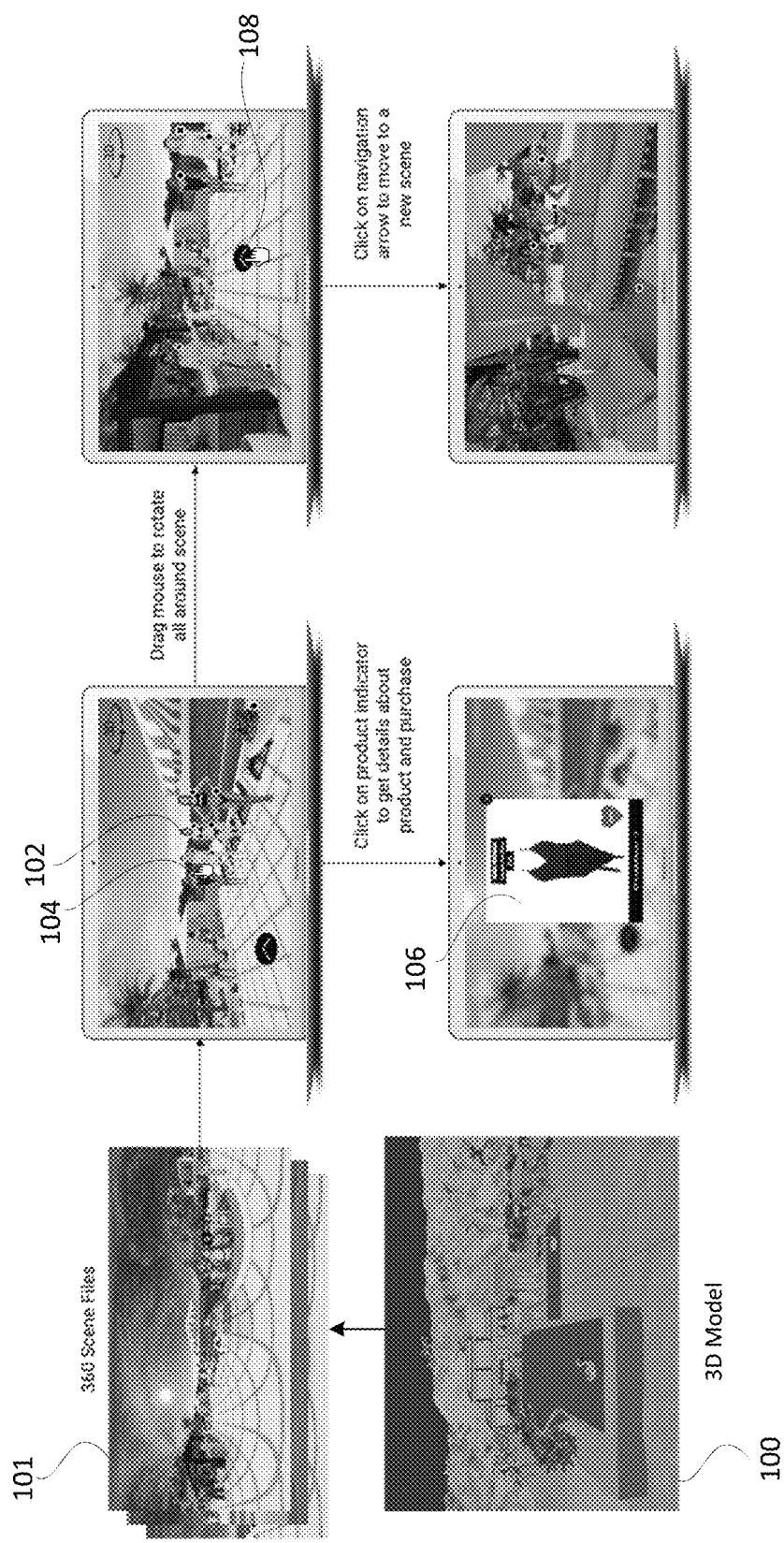
FIGS. 1A-1K show overviews example implementations of custom virtual environments for shopping in accordance with aspects of the present disclosure.

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

The structure of online shopping websites may lead to a monotonous online shopping experience, where shopping on every website feels the same to the user. Further, online shopping includes the tedious task of scrolling through lists and lists of products on subsequent pages, where all products look the same as they are presented in an identical format. Presentation of products is often devoid of context, of how they are used in real life, and of their relation to each other. For example, a user wishing to purchase a skirt and a top would have to go to the skirt category page and then to the tops category page separately, which will not allow the user to be able to see what garments go together. As another example, a user wishing to purchase multiple products for their beach vacation would be required to look in a variety of different category pages for each type of product.

Existing online shopping platforms do not always allow a user to easily discover new types of products as the interaction with these platforms primarily begins by searching for a specific product, or by browsing a category, so the user is making a pre-determined selection. However, in a real-life situation, a user is often walking past multiple stores on a street or browsing through stores in a mall, and they might see a category that they weren't specifically looking for, but in which they are interested. Alternatively, once inside a store, the user might see products around that they were not originally looking for. This type of discovery experience is lacking in existing online shopping platforms.

Existing virtual shopping systems are based on replicating a physical retail store layout virtually, for example with its aisles and shelves, or on recreating a layout similar to physical retail stores. Recreating a physical store layout in a digital environment is not ideal, as all products would not be clearly visible as they were arranged for physically being present at the store. Further, while virtual shops may replicate a real-life experience when shopping in the physical store, these virtual shops provide a static user experience in which the virtual shop remains unchanged as to represent a static physical "brick and mortar" store. Thus, the user's experience when interacting with a virtual store is static, and potentially uninteresting to the user. Accordingly, aspects of the present disclosure may provide a dynamic and digitally-created contextual environment that displays products in a setting of how they would be used or related to an individual user's personal style, tastes, preferences, and interests. That is, aspects of the present disclosure are not merely a replica of a physical retail store, rather, aspects of the present disclosure generate a custom, virtual shopping environment that is unique to the user and to a set of products. As described herein, the virtual environment may include any variety of scenes/settings to display any variety of products (e.g., clothing, furniture, personal effects, etc.). That is, aspects of the present disclosure generate a digital environment that is unique to the user to aid a user in more accurately visualizing how a product may be used in a context that is relevant and unique to the user.

As an illustrative, non-limiting example, aspects of the present disclosure may generate a virtual environment for shopping before going on a beach vacation, that is set on an outdoor patio at a beach in which the virtual environment further includes avatars wearing a variety of clothing that the user may be interested in purchasing. In some implementations, the setting of the virtual environment may represent a real-life geographical location, or may alternatively be of a fictional location. In some implementations, the virtual environment may be rendered in three dimensions (3D) using Computer-Generated Imagery (CGI) that is photorealistic and the products within the environment may be rendered using photographs or 3D models of the products (e.g., of clothing or other products). In some implementations, the user may be presented with a series of unique virtual environments based on the season, trends of the time, selections of curators and the user's own interests. Each virtual environment may contain multiple products manufactured by different brands/manufacturers. In some implementations, the user may look all around a virtual environment in 360 degrees, move around inside the environment to different product viewing locations, select a product to see additional detailed information, interact with the product, see the product from all around in 3D, see how the product will look in real surroundings (e.g., using a camera on the user device), and purchase the product. The user may access and view the virtual environments on any variety of user devices (e.g., mobile device, desktop or laptop computer, virtual-reality headsets, or the like).

As described herein, aspects of the present disclosure may create a customized virtual shopping experience for a user by creating a computer-generated customized virtual environment. In some implementations, the customized virtual environment may be generated based on a variety of factors unique to the user (e.g., user interest, shopping history, style preferences, product type preferences, etc.). Additionally, or alternatively, the customized virtual environment may be generated based on photographs of the user, the user's home, the user's office, the user's friends/family (e.g., from social media networks), the user's favorite sceneries and locations, etc. In some implementations, products placed within the virtual environment may be determined based on one or more of the aforementioned factors, and may also be user defined and/or user selected.

Embodiments of the disclosure may include a system, a method, and/or a computer program product at any possible technical detail level of integration. The computer program product may include a computer readable storage medium (or media) having computer readable program instructions thereon for causing a processor to carry out aspects of the present disclosure.

FIGS. 1A-1K show overviews of different example implementations of custom virtual environments for shopping in accordance with aspects of the present disclosure. In some embodiments, one or more of the virtual environments illustrated in FIGS. 1A-1K may be presented on a user device (e.g., laptop/desktop computer, mobile device, tablet device, etc.) via a computer-based application (e.g., a web-based application, a locally hosted application), a web browser/web page, or the like. As described in greater detail herein, a virtual environment generation server may host an authoring application to build a virtual environment and present the virtual environment to users via user devices.

Referring to FIG. 1A, a 3D model 100 may be used to create 360-degree scenery files 101, which, in turn, may be used to generate a virtual environment having a particular scenery. In some embodiments, the 3D model 100 may be a computer-generated rendering, computer-generated drawing (e.g., computer-aided design (CAD) drawing, computer-generated imagery (CGI) drawing), or the like. In the example of FIG. 1A, the 3D model 100 illustrates a patio at beach, and the scenery files 101, generated from this 3D model 100, show the patio at various angles. As described in greater detail herein, the 3D model 100 may be used to generate a virtual environment using a cube mapping technique (e.g., instead of, or an addition to, creating the virtual environment using the 360-degree scenery files 101).

As further shown in FIG. 1A, the virtual environment may include avatars 102 and buttons 104. The buttons 104 may be selected to "zoom in" on a product within the virtual environment to obtain additional information (e.g., as shown in window 106). In the example of FIG. 1A, the products are of summer or beachwear (e.g., swimsuits, etc.). In some implementations, the avatars may be of a user and/or the user's friends/family. Additionally, or alternatively, the avatars may be of fictional characters or based on stock photos. As further shown in FIG. 1A, the virtual environment may be rotated around up to 360 degrees (e.g., by using a mouse, touch, or other input). When rotated, the virtual environment may display additional scenery and may include a navigation arrow button 108 to scroll through other portions and scenes of the virtual environment as shown.

More specifically in FIG. 1A, a beach environment is presented (e.g., in an example in which the user is shopping for a beach vacation). The virtual beach environment shows a resort, a patio, a swimming pool, and a beach/ocean. Individuals (e.g., represented by avatars 102) are shown in the swimming pool and standing around the patio/resort area wearing bathing suits. These bathing suits are example products that the user can purchase. Other example products may include a towel that's shown on a lounge chair, a float shown in the swimming pool, and patio furniture shown on the deck. Using the virtual environment, the user can purchase and/or obtain additional information regarding the bathing suits, the towel, float, or patio furniture. In contrast with conventional online stores, instead of showing a table with identical-sized photos of products on a plain background, with different tables for each product category like bathing suits, towels, etc., or showing a retail store with aisles and products on shelves, the user is presented a cohesive and visual way to find products they need in the way they will actually use them, in an aesthetic and interactive environment.

Figure 1B:
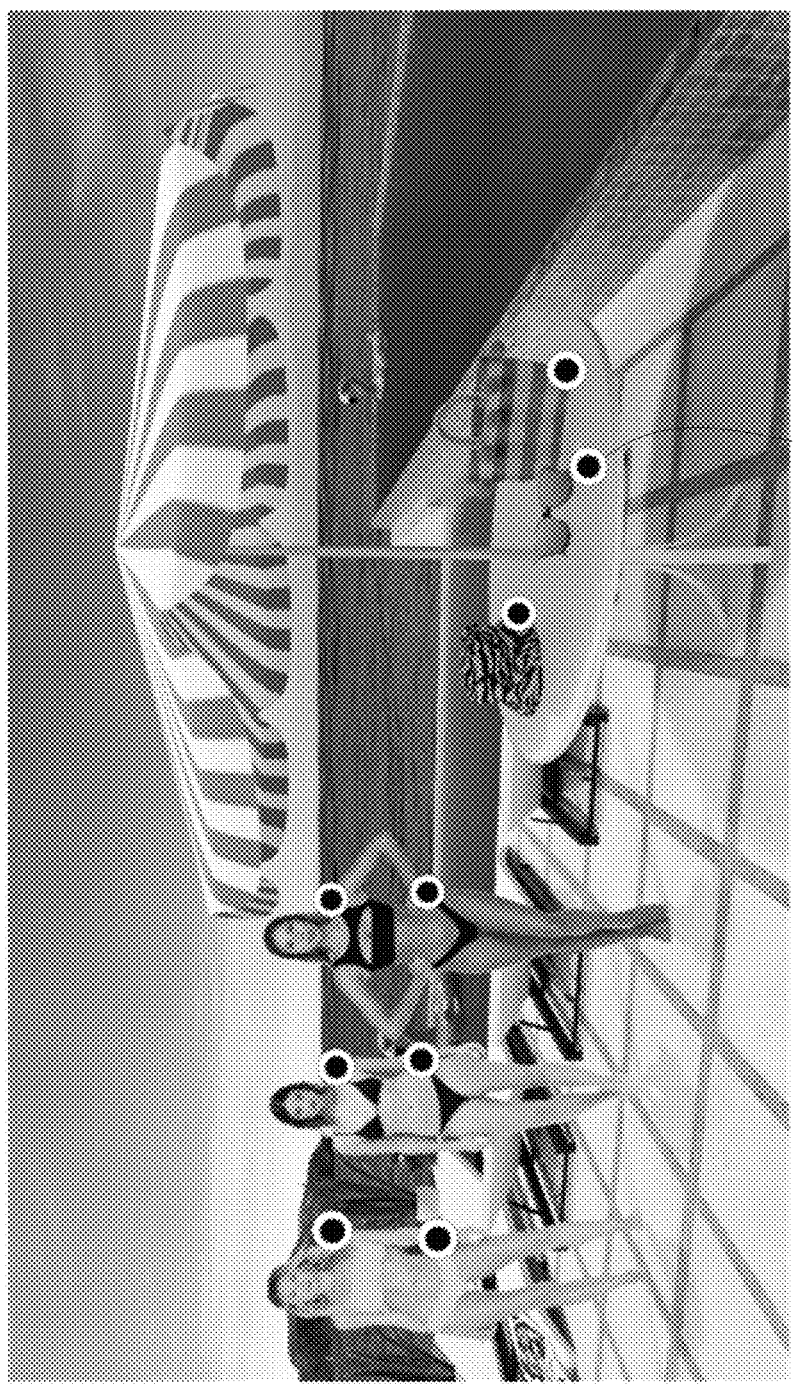

FIG. 1B shows an example of a scene within the virtual environment of FIG. 1A, and additional details of the buttons 104. As shown in FIG. 1B, a scene 150 may be presented to the user (e.g., when the user browses to the scene of FIG. 1A using the navigation arrow buttons 108). In FIG. 1B, buttons 104 may be selected to obtain additional information regarding products (e.g., sunglasses, purses, swimsuits). Also, the scene 150 shows how the products may look in a real-life setting to aid the user in making shopping decisions.

Figure 1C:

FIG. 1C shows an example of holiday decorations in another example virtual environment. In the example of FIG. 1C, the virtual environment shows a home decorated with a variety of products for the holidays. The living room is shown with a holiday tree where ornaments can be purchased. The couch is shown with holiday-themed cushions and blankets that can be purchased. A variety of stockings are shown above the fireplace that can be purchased. From the virtual environment, the user can move into the dining room, where a fully set up and decorated dining table is shown, and the user can purchase and/or obtain additional information regarding the centerpiece, the candles, the holiday-themed plates, cups, and so on. The virtual environment of FIG. 1C shows how the products may look in a real-life setting to aid the user in making shopping decisions. Also, within the virtual environment of FIG. 1C, the user may click and drag to rotate the scene up to 360 degrees for a full spectrum view of the environment. When the scene is rotated, the user may view other objects and products in the scene.

Figure 1D:
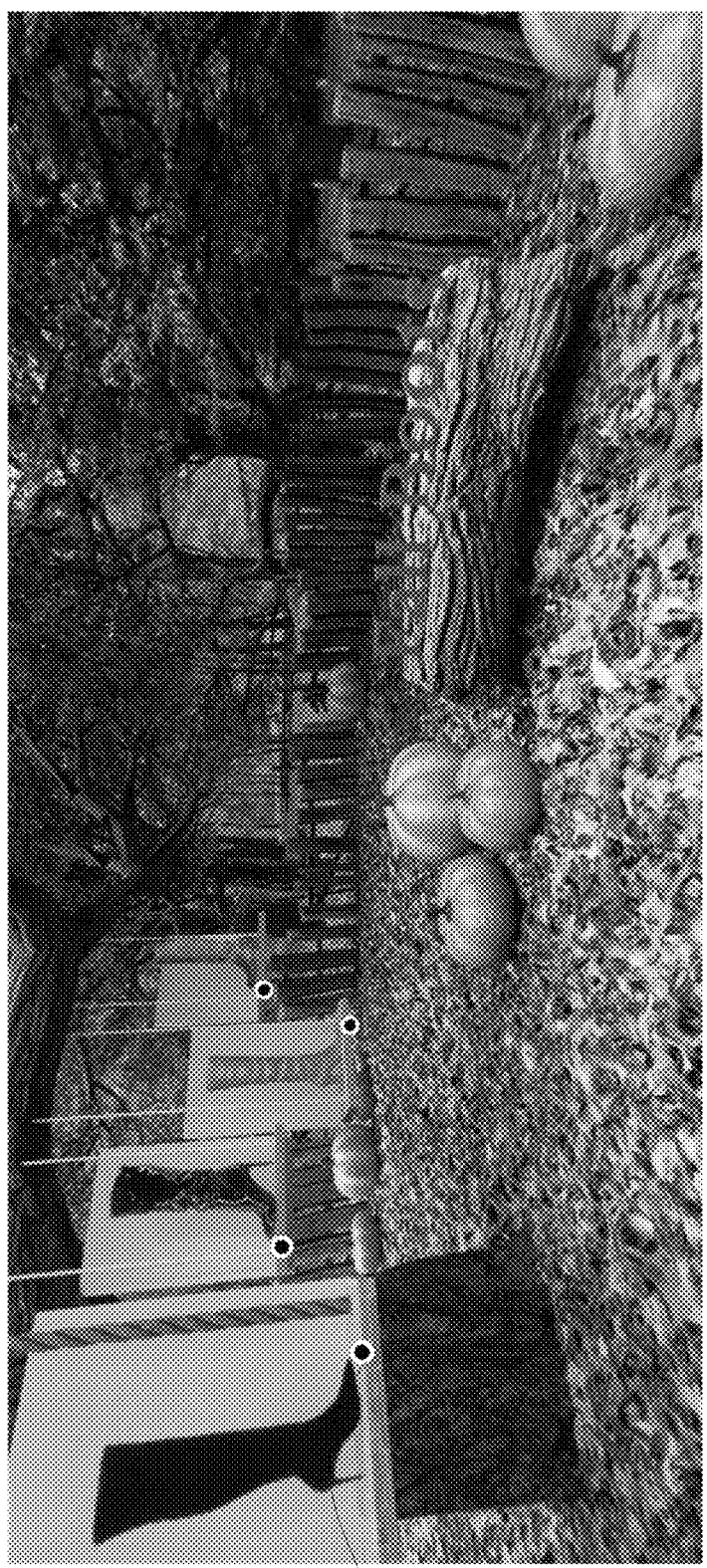

FIG. 1D shows an example outdoor virtual environment that is presented for shopping for boots for the autumn season. The example virtual environment of FIG. 1D shows a New England fall forest scene with trees with red and orange leaves. The shoes are displayed on tree stumps and branches. This puts the user in the fall mood while being in a visually stimulating and completely unique shopping experience that will not be found in online shopping or retail stores. Also, within the virtual environment of FIG. 1D, the user may click and drag to rotate the scene up to 360 degrees for a full spectrum view of the environment. When the scene is rotated, the user may view other objects and products in the scene.

As described herein, the virtual environment, in accordance with aspects of the present disclosure, may also include interaction features in which a user may interact with content presented within the virtual environment. These interactions may assist the user in the shopping process by providing more information about a brand (e.g., manufacturer), providing more details about a particular collection of products and the designer's intent behind their design, or providing tips on how to use the product.

Figure 1E:
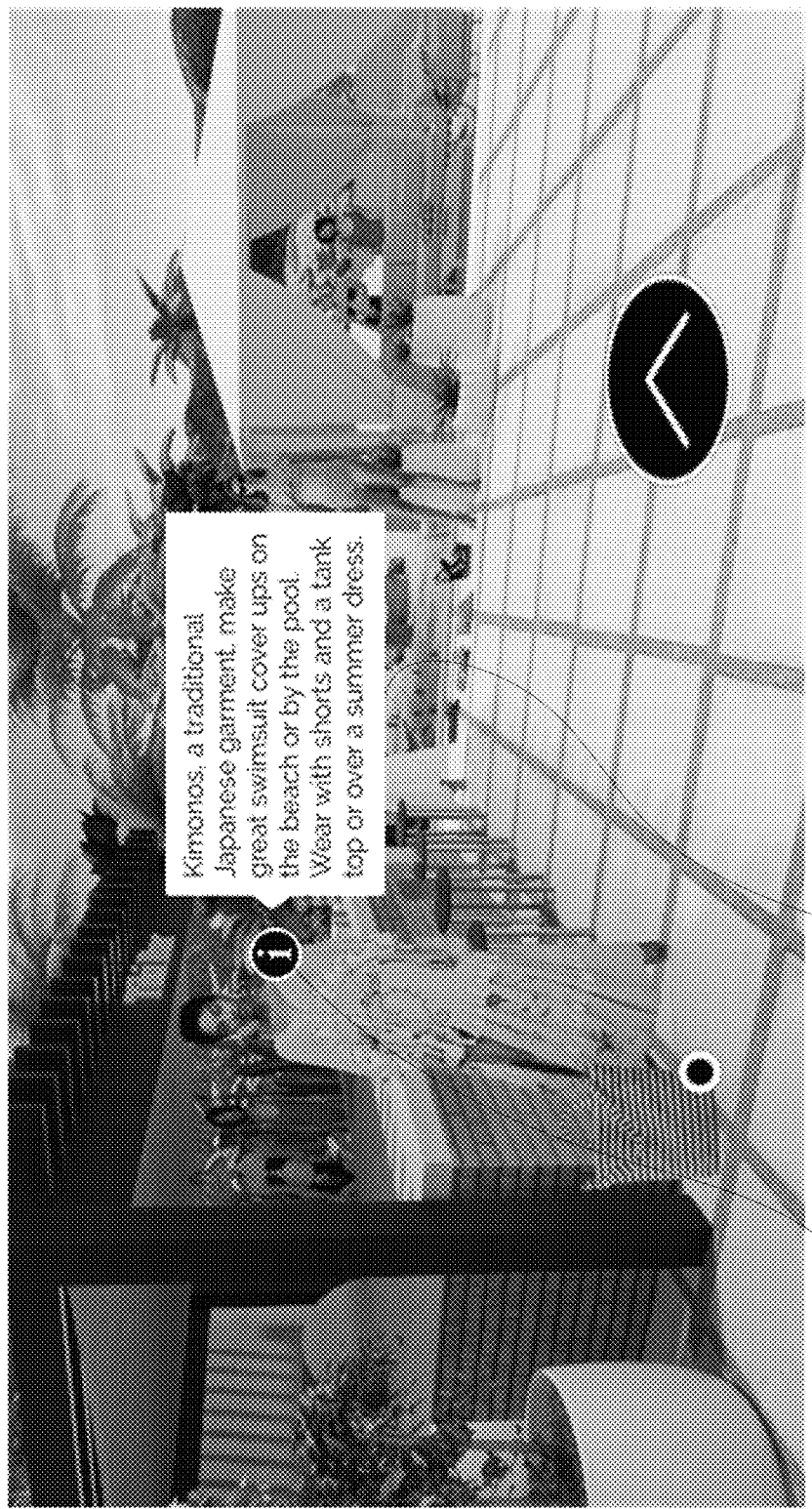

FIG. 1E illustrates example interactions with content presented within a virtual environment. As shown in FIG. 1E, a virtual environment 175 may include an item with a button 104 that, when selected by a user, may present a window 106 having additional information about the item. For example, the additional information may include textual information, a caption related to a type of product, and/or information related to a designer or a collection of products.

Figure 1F:
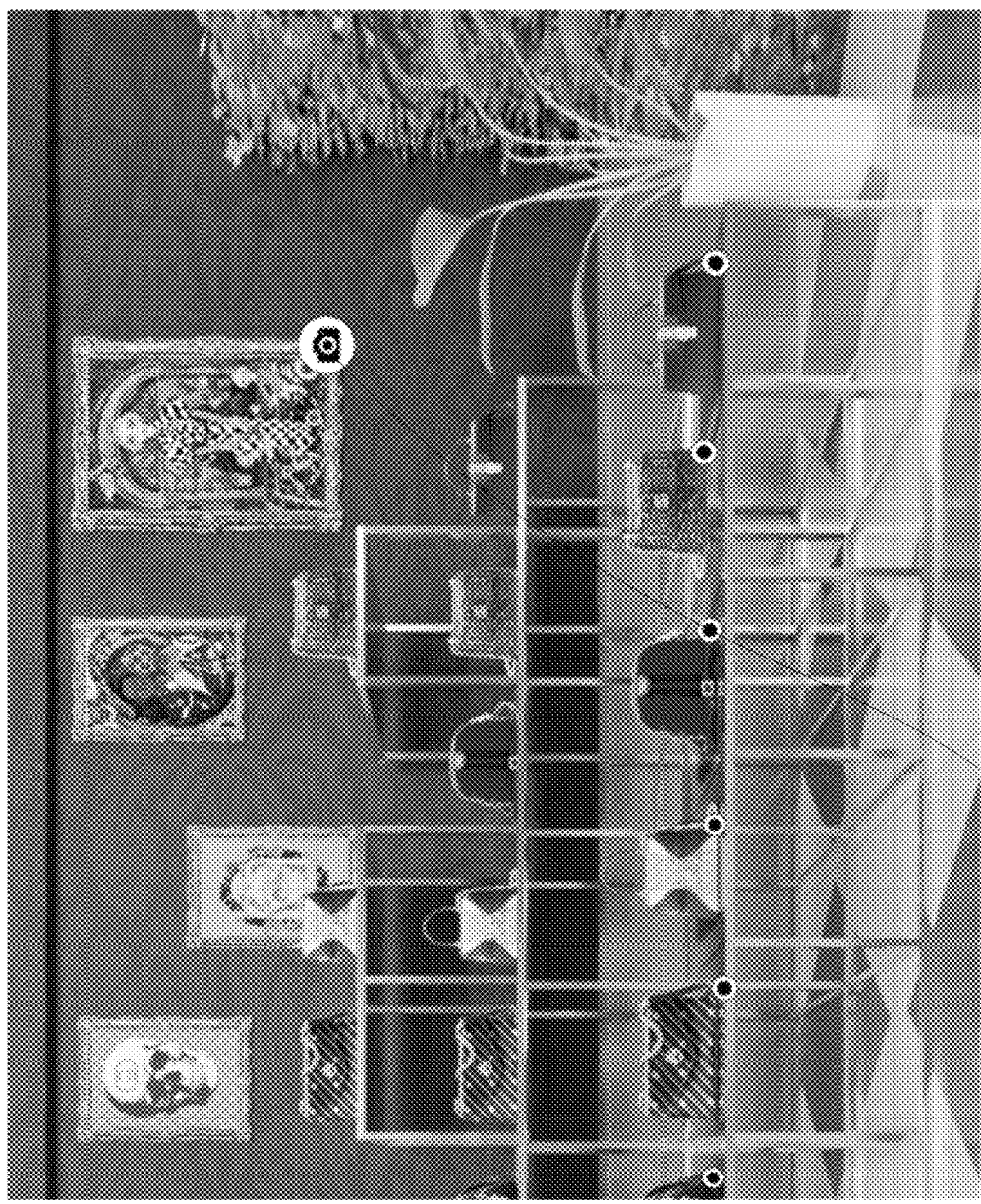
Figure 1G:
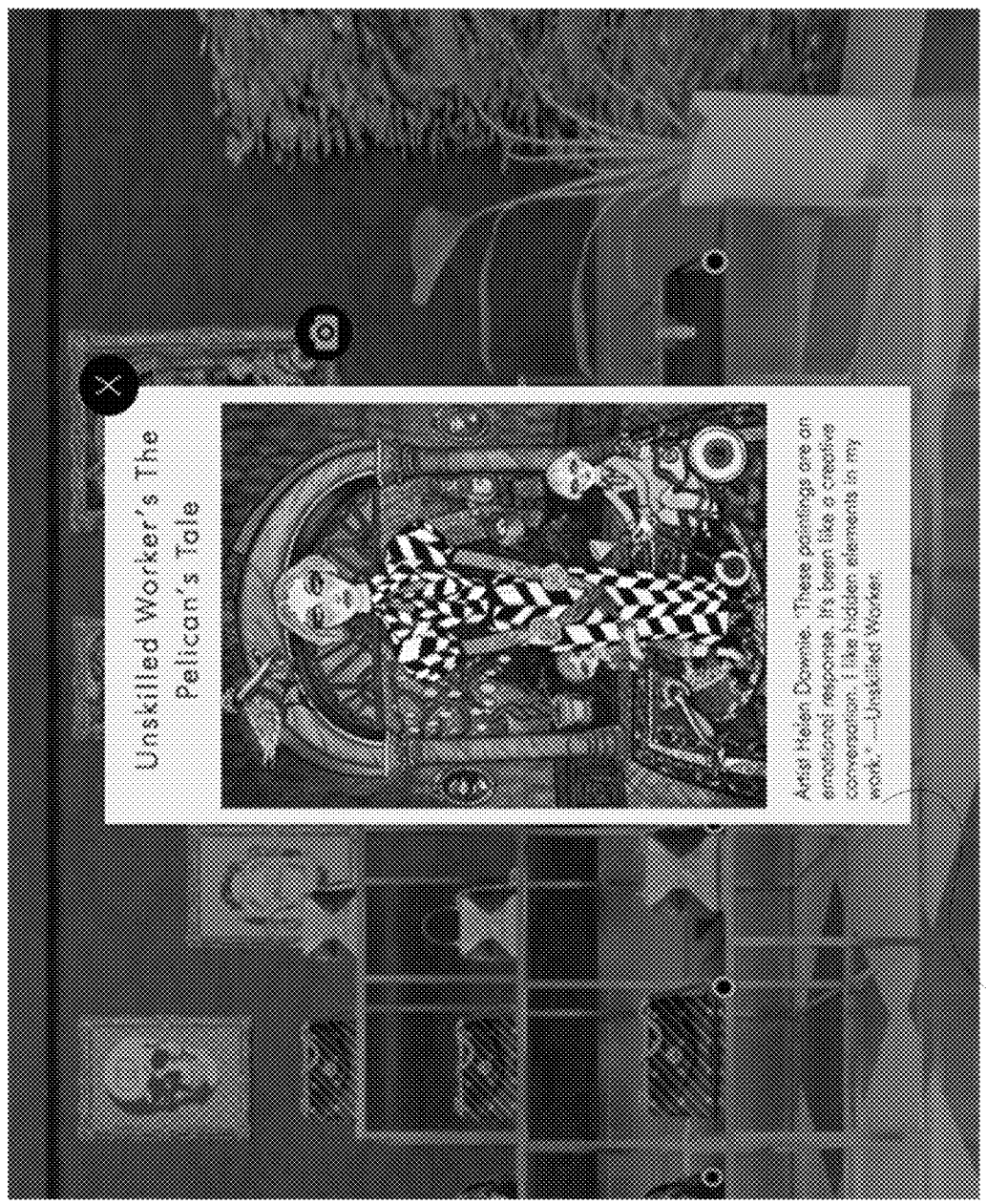

FIG. 1F illustrates example interactions with content presented within a virtual environment. As shown in FIG. 1F, a virtual environment 180 may include a setting inside of a room in which the virtual environment 180 includes photos or posters or paintings on the wall. The posters may include a button 104, that, when selected, may present (e.g., within a window) additional information for the item selected. For example, referring concurrently to FIGS. 1F, and 1G, upon selection of the button 104 in FIG. 1F, a window 106 (as illustrated in FIG. 1G) may be presented in which the window 106 shows the painting in a larger size and provides information about the artist and a quote about how the work relates to the products presented around the painting in the virtual environment.

Figure 1H:
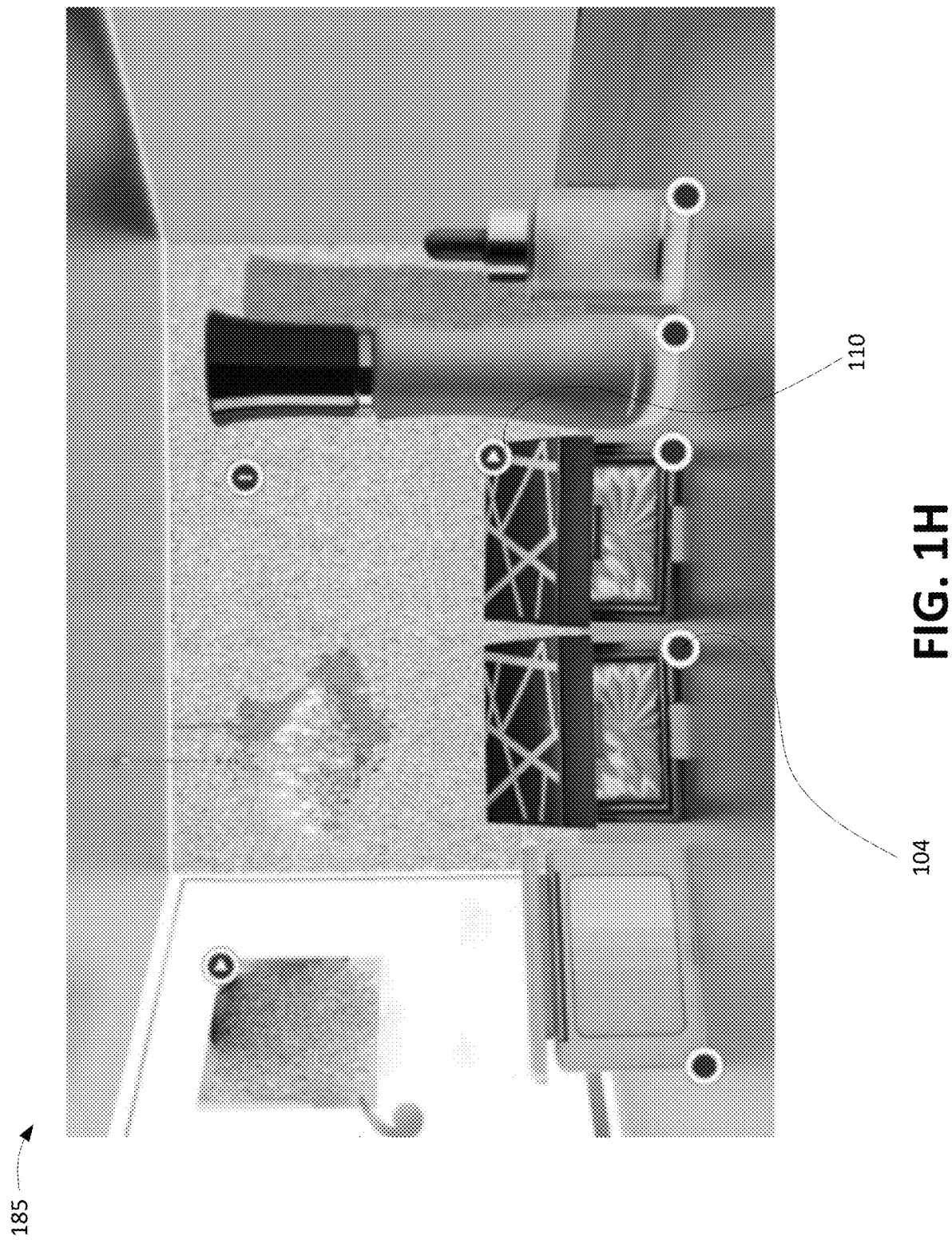
Figure 1I:
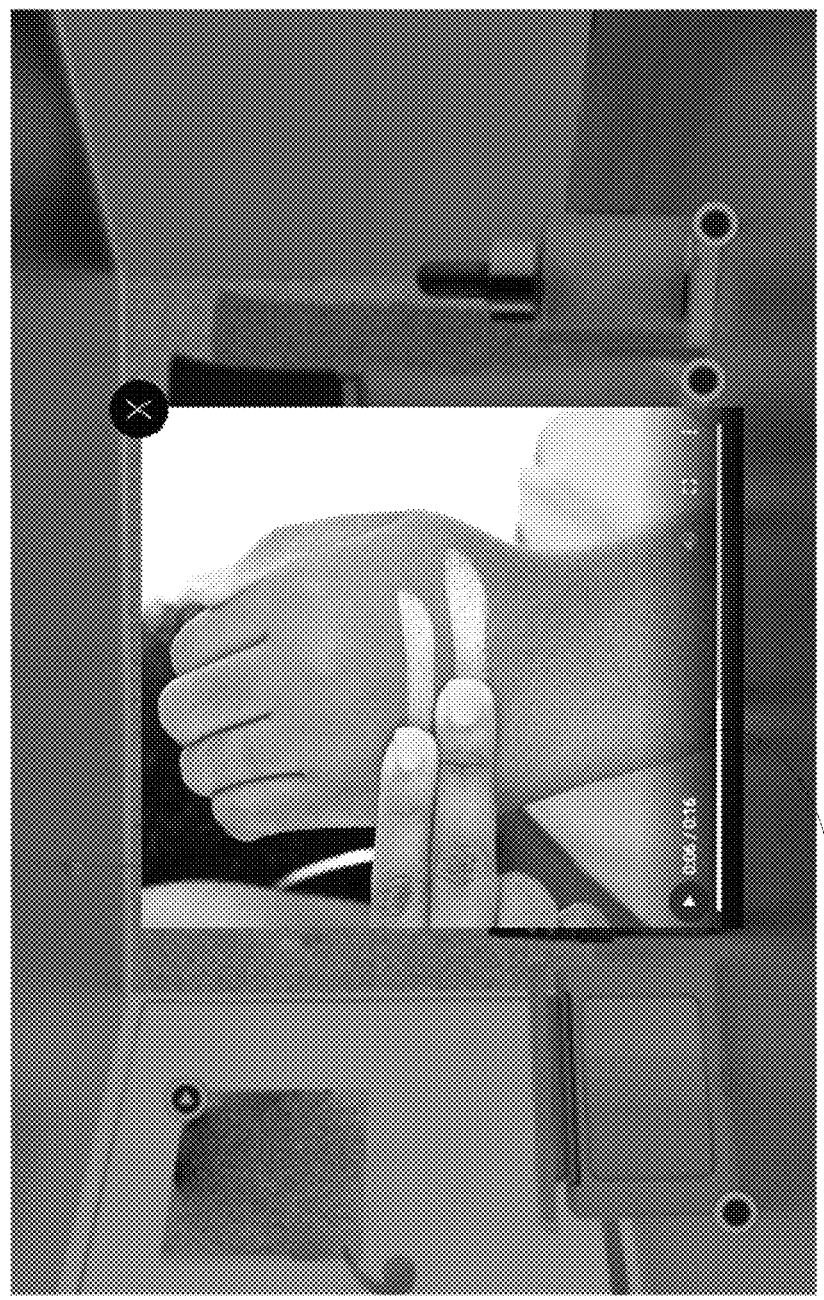

Additional types of interactions may also be presented within virtual environments, as described herein. For example, referring to FIGS. 1H and 1I, videos may be presented within a virtual environment. As one example, and as illustrated in FIG. 1H, a virtual environment 185 may include a virtual display of a product (e.g., a cosmetology product). The virtual environment 185 may include a video button 110 overlaid on a product that, upon selection, will present a video regarding the product, for example showing how the colors of the product appear on different skin tones (e.g., as illustrated in the window 106 of FIG. 1I).

Figure 1J:
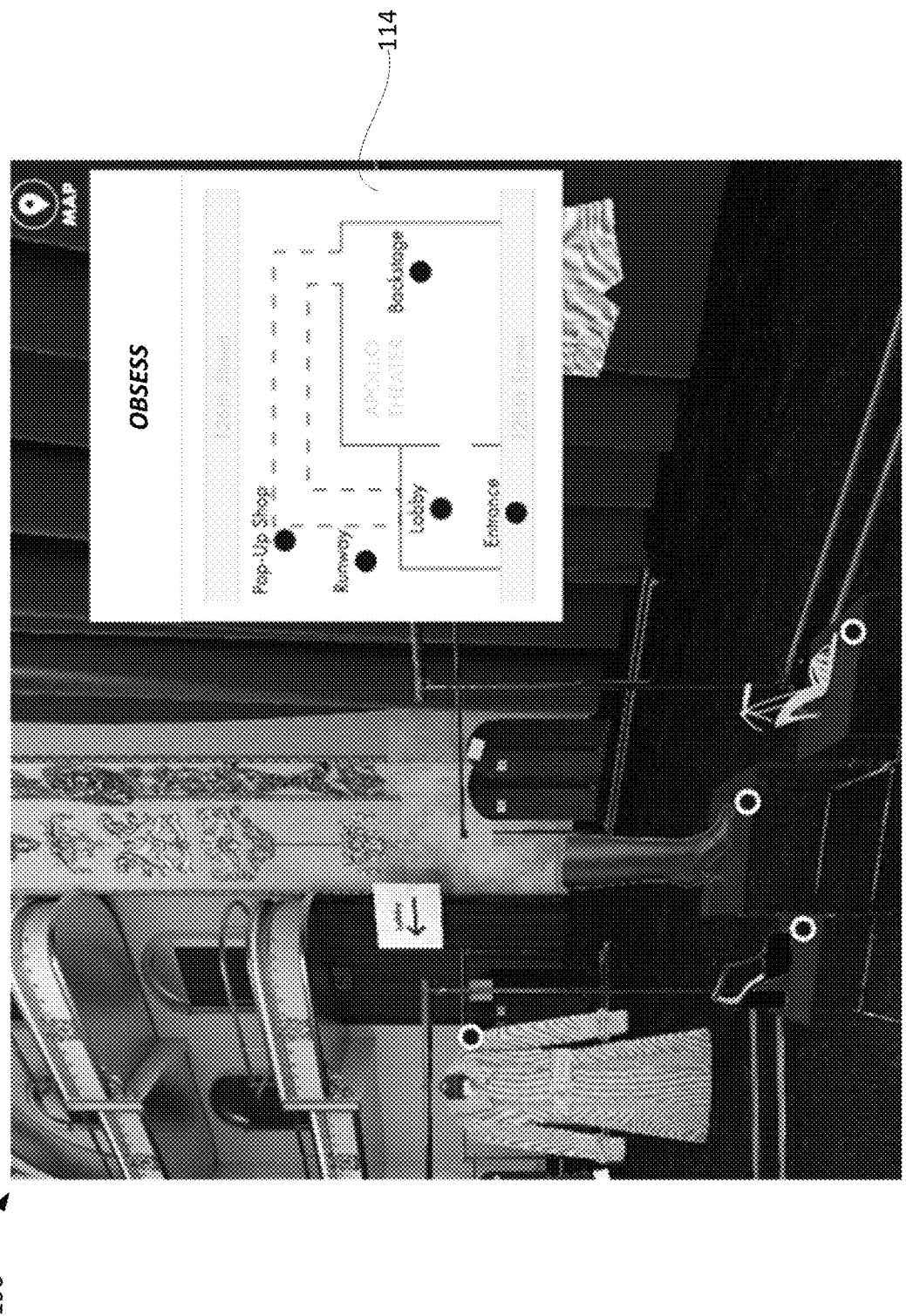

Referring to FIG. 1J, a virtual environment 190 may include additional interaction features, such as a map 114. As previously described, a user may navigate through the virtual environment. Thus, a map, such as the map 114, may aid the user in navigating through the different sections of the virtual environment 190 of FIG. 1J.

Figure 1K:

Referring to FIG. 1K, a virtual environment 195 may include additional interaction features, such as a counter 116. In some embodiments, the counter 116 may identify a number of users currently "present" in the virtual environment 195 (e.g., viewing the virtual environment 195).

As described herein, the scenes within virtual environments may be customized to the user. For example, the user's preferences, experiences, interests, shopping history, social media network connections, scene selections, etc., may be used as inputs to a renderer in which the renderer generates the virtual environment custom to the user. In this way, a virtual environment includes scenes, products, avatars, etc. that represent a real-life situation that the user may view in order to better visualize how products may look in a real-life setting that is relevant to the user. In some implementations, the scenery in the virtual environments may be based on real-life locations and/or simulated scenes. In some implementations, the scenery may be rendered based on input data from a mapping service.

Figure 2:
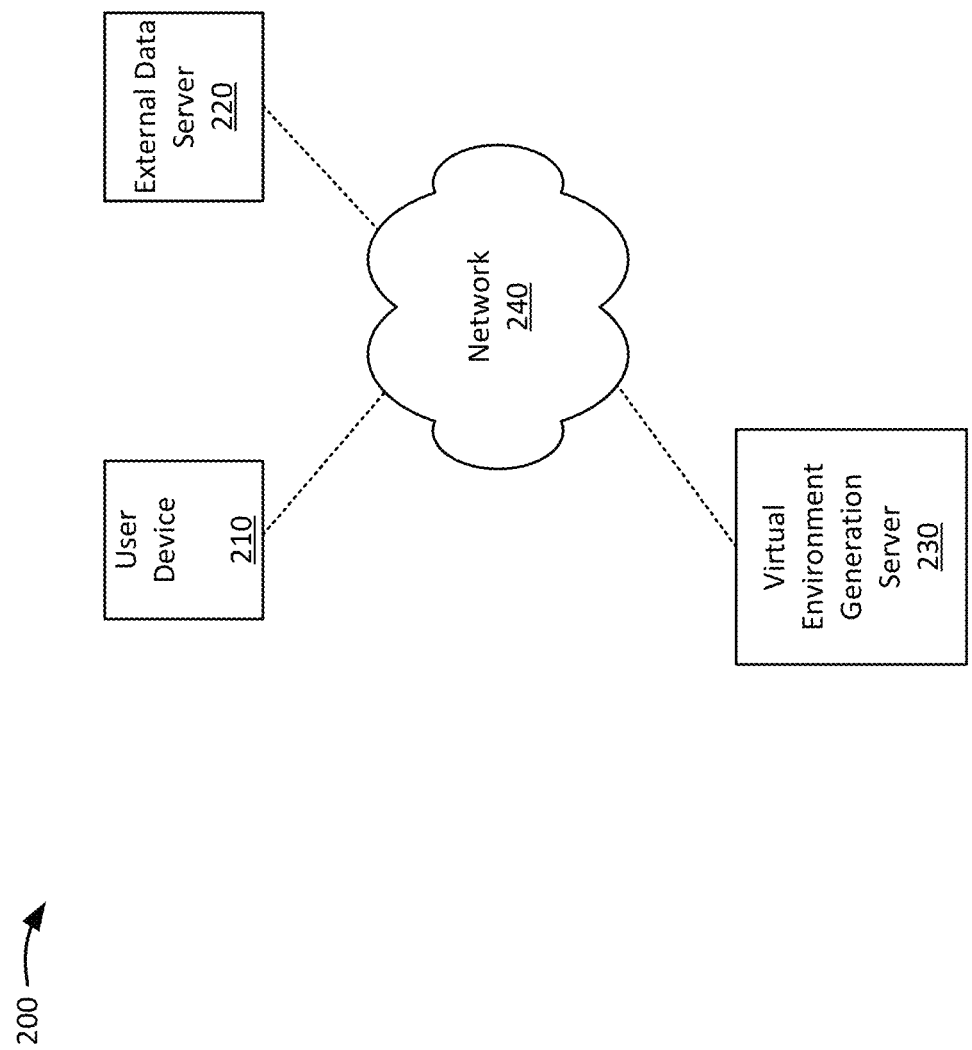
FIG. 2 shows an example environment as described herein.

FIG. 2 shows an example environment in accordance with aspects of the present disclosure. As shown in FIG. 2, environment 200 includes user device 210, external data server 220, virtual environment generation server 230, and network 240.

User device 210 includes a computing device capable of communicating via a network, such as the network 240. In example embodiments, user device 210 corresponds to a mobile communication device (e.g., a smart phone or a personal digital assistant (PDA)), a portable computer device (e.g., a laptop or a tablet computer), a desktop computer, a virtual reality device, an augmented reality device, and/or another type of computing device. In some embodiments, user device 210 may access a virtual environment generated and/or hosted by the virtual environment generation server 230. The user may interact with the virtual environment and provide user inputs (e.g., touch inputs, mouse inputs, voice inputs, gyroscope inputs through movement of the user device 210, etc.) to scroll/browse through the virtual environment, modify the virtual environment, obtain additional information regarding products in the virtual environment, etc. In some implementations, user device 210 may access the virtual environment via a web page, a web-based application, or the like.

The external data server 220 includes one or more computing devices that store information that may be used to generate virtual environments. For example, the external data server 220 may store user profile information identifying the user's interests, social networking data, shopping history, style preferences, product type preferences, user images, etc. In some implementations, the user profile information may store information that the user has specifically provided in order to generate more customized virtual environments for the user. For example, the user profile may include photographs of the user, the user's home, the user's office, etc. In some implementations, the external data server 220 may also store additional information that may be used to generate virtual environments, such as data from indoor and/or outdoor mapping services, images of locations, and/or other information that may be used to generate a 3D layout of the virtual environment. Additionally, or alternatively, the external data server 220 may store product information to display within the virtual environment.

The virtual environment generation server 230 includes one or more computing devices that generates a virtual environment for display via a web page, web-based application etc. For example, the virtual environment generation sever 230 may host an authoring application via which a virtual environment may be authored, modeled, or otherwise created. In some implementations, the virtual environment generation server 230 may generate a custom web environment for a user based on user-specific data from the external data server 220. Additionally, or alternatively, the virtual environment generation server 230 may generate a virtual environment based on a set of parameters specific to the user and/or defined by the user. In some implementations, the parameters may include scenery parameters, avatar parameters, product parameters, etc.

As described herein, the virtual environment generation server 230 may be used to build a 3D model as a basis for creating a virtual environment. Additionally, or alternatively, the 3D model may be built on a different device, and provided to the virtual environment generation sever 230 such that the virtual environment generation sever 230 may create the virtual environment using the 3D model. In some embodiments, the virtual environment generation sever 230 may create the virtual environment based on a 3D model/3D layout, user input, information identifying materials in the virtual environment, lighting information, product images/videos, product data, product location coordinates, navigation arrow coordinates, interaction data and/or any other variety of input data that may define the appearance and/or layout of the virtual, as well as the interactions included within the virtual environment. In some embodiments, the virtual environment generation sever 230 may generate 360-degree files based on the 3D model as part of generating the 3D environment. Additionally, or alternatively, the virtual environment generation sever 230 may use a cube mapping technique with the 3D model as an input to generate the 3D environment.

The network 240 may include one or more wired and/or wireless networks. For example, the network 240 may include a cellular network (e.g., a second generation (2G) network, a third generation (3G) network, a fourth generation (4G) network, a fifth generation (2G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 240 may include copper transmission cables, optical transmission fibers, wireless transmission, routers, firewalls, switches, gateway computers and/or edge servers.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 3:
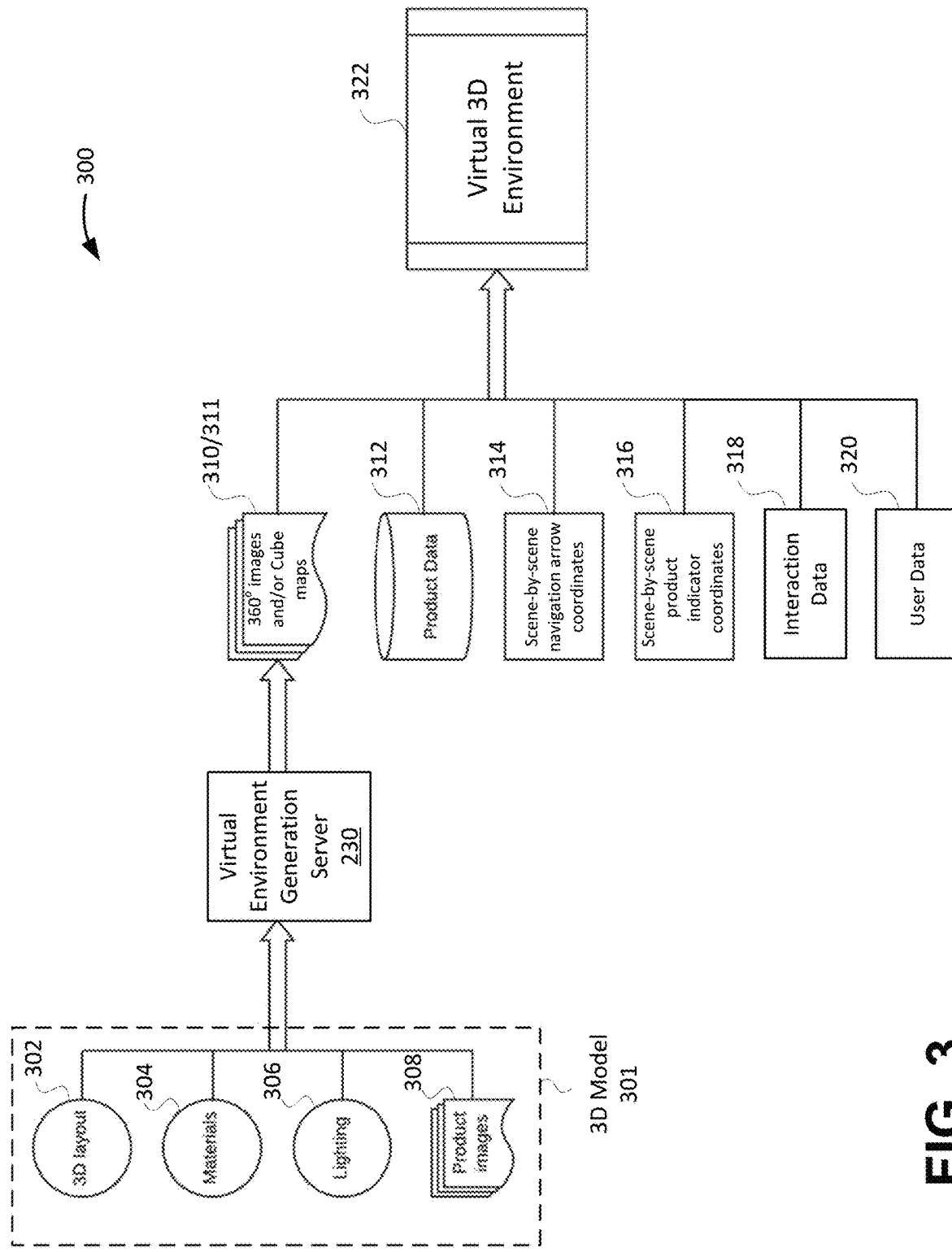
FIG. 3 illustrates an example flow diagram illustrating a process for generating and presenting a virtual environment in accordance with aspects of the present disclosure.

FIG. 3 illustrates an example diagram of an example process 300 for generating a virtual 3D environment in accordance with aspects of the present disclosure. More specifically, the process 300 illustrates the inputs and process steps that may be taken to generate the virtual 3D environment 322 shown in FIG. 3.

As shown in FIG. 3, the virtual environment generation sever 230 may receive a 3D model 301. As described herein, the 3D model may be a computer-generated rendering, computer-generated drawing (e.g., computer-aided design (CAD) drawing, computer-generated imagery (CGI) drawing), or the like. In some embodiments, the 3D model 301 may include a 3D layout 302, materials information 304, lighting information 306, and/or product images 308. The 3D layout 302 may include a 3D floor plan of an area for which to base the virtual 3D environment 322. Additionally, or alternatively, the 3D layout 302 may include fixtures and/or decorative elements. In some embodiments, the 3D layout 302 may further include a list of viewpoint coordinates (e.g., coordinates of viewpoints from which the user may view the virtual 3D environment 322). The materials information 304 may identify the colors, patterns, textures, etc. to be applied each surface in the 3D layout 302. The lighting information 306 may identify lighting types, locations intensities, colors, etc. to be applied within the virtual 3D environment 322. The product images 308 may include 2D images or 3D models of products to be included in the virtual 3D environment 322.

In some embodiments, the 3D model 301 may be authored or constructed by a user (e.g., an author) using a 3D modeling application/system. In some embodiments, the 3D modeling application may be hosted by the 230, or hosted by another device. In either case, the virtual environment generation sever 230 may receive the 3D model 301 in connection with generating a virtual 3D environment 322 (e.g., whether the 3D model is generated by an application hosted by the virtual environment generation sever 230 or by a different device). In some embodiments, the 3D model 301 may be created by design a floorplan, constructing the 3D layout 302, designing the fixtures and decorative elements, selecting materials including color and pattern for each surface and applying them as textures, selecting lighting type and locations and adding lights to the environment, clipping product images to remove background, placing the clipped product images or product 3D product models into the environment, setting the surface material, and adding spot lighting to individual products.

In some implementations, the 3D model 301 may be converted (e.g., by the virtual environment generation sever 230) into a series of equirectangular 360-degree images 310 and/or cube maps 311. An example process for generating the cube maps 311 is described in greater detail below with respect to FIG. 4. As described herein, the 360-degree images 310 may each include a "scene" or portion of the entire virtual 3D environment 322. As an illustrative example, the 360-degree images 310 may be created based on the author's selections of a number of scenes through which the environment may be viewed, the locations of the scene mid-points (i.e. the viewpoints) with consideration to the product placement and locations in which the products may be clearly viewed (e.g., in x, y, z coordinates), information identifying a front-facing direction, and resolution settings (e.g., different resolutions of images to be rendered and served based on network conditions). The virtual environment generation sever 230 may process the 3D model 301 based on the above described inputs provided by the author to produce equirectangular 360-degree images 310 (e.g., Computer-Generated Imagery (CGI) from each scene). More specifically, the 360-degree images 310 illustrate the user's perception as if the user were standing at the viewpoint coordinates, flattened out into 2-dimensions, with all the textures and lighting applied. In some embodiments, 360-degree images 310 may be compressed for improved load and/or transmission time. Further, multiple sets of 360-degree images 310 at different resolutions may be generated and stored in the virtual environment generation sever 230.

After generation of the 360-degree images 310 and/or the cube maps 311, the virtual 3D environment 322 may be further constructed using product data 312, scene-by-scene navigation arrow coordinates 314, scene-by-scene product indicator coordinates 316, interaction data 318, and/or user data 320. In some embodiments, the virtual environment generation sever 230 may include a user interface for receiving and/or storing the product data 312, scene-by-scene navigation arrow coordinates 314, scene-by-scene product indicator coordinates 316, interaction data 318, and/or user data 320.

The product data 312 may include a data file containing information about the products included in the virtual 3D environment 322 (e.g., products with which the user may interact and/or purchase). The product data 312 may include a variety of product information and characteristics such as product ID, product name, brand name, price, thumbnail images, etc. In some embodiments, the product data 312 may also store information linking a 3D model of a product to a product ID.

The scene-by-scene navigation arrow coordinates 314 may indicate locations for the placement of navigation arrow buttons (e.g., similar to navigation arrow button 108) that, when selected, scroll the view of the virtual 3D environment 322 to a different scene. Thus, the scene-by-scene navigation arrow coordinates 314 may place the navigation arrow buttons into each scene at appropriate locations depending on the layout. Identifiers of each scene may be linked with the scene-by-scene navigation arrow coordinates 314 and, these links may be stored in the virtual environment generation sever 230.

The scene-by-scene product indicator coordinates 316 may identify the locations in which products may be placed into each scene, or locations where the products may appear in a scene. The scene-by-scene product indicator coordinates 316 may identify a set of coordinates for a product, and a product ID linked to the set of coordinates, thus indicating the particular location of a particular product in the virtual 3D environment 322.

The interaction data 318 may identify the types of interactions present within the virtual 3D environment 322. Example interactions are described above with respect to FIGS. 1E-1K. In some embodiments, the interaction data 318 may identify a product or object in the virtual 3D environment 322, the type of user interaction the user may have with the product or object (e.g., presenting a video regarding the object, presenting textual information regarding the object, etc.), and the data for providing the interaction (e.g., text data, video file, audio file, etc.).

The user data 320 may include any variety of information for a particular user that may be incorporated in the construction of the virtual 3D environment 322. Examples of user data 320 may include user identifier, user shopping history, user shopping interests, user general interests, user information from social media, etc. In some embodiments, the user data 320 may be used to determine the types of products and/or product interactions to incorporate or include in the virtual 3D environment 322. Further, it is possible that the scenes, product placements, and navigation arrow placements may be based on the user data 320. In this way, different customized virtual 3D environments 322 may be generated for different users or different types of users having a common set of interests or attributes.

As described herein, using the 360-degree images 310 and/or the cube maps 311, the product data 312, scene-by-scene navigation arrow coordinates 314, scene-by-scene product indicator coordinates 316, interaction data 318, and/or user data 320, the virtual environment generation sever 230 may complete the construction of the virtual 3D environment 322. Additionally, or alternatively, the virtual environment generation sever 230 may complete the construction of the virtual 3D environment 322 based on other information or data, such as data identifying the appearance and placement of avatars, clothes/products worn by the avatars, etc. The completed virtual 3D environment 322 may include a variety of scenes through which the user may navigate in which each scene may include one or more products, production interactions, as well as product buying options. Examples of virtual 3D environments 322 are shown in FIGS. 1A-1K. Also, multiple virtual 3D environments 322 may be generated for different users or groups of users, and multiple virtual 3D environments 322 may be generated at different resolutions and served to the user (e.g., via the user device 210) at the appropriate resolution based on network conditions.

Figure 4:
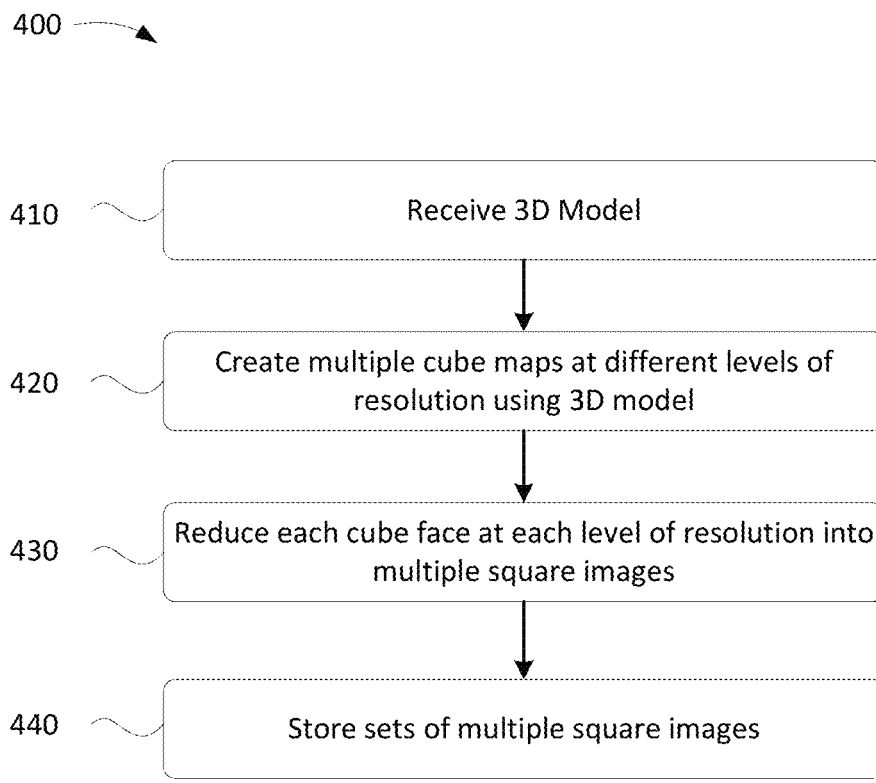
FIG. 4 illustrates an example flowchart of a process for generating a virtual 3D environment based on a 3D model and a cube mapping process.

FIG. 4 illustrates an example flowchart of a process for generating a virtual 3D environment based on a 3D model and a cube mapping process. The blocks of FIG. 4 may be implemented in the environment of FIG. 2, for example, and are described using reference numbers of elements depicted in FIG. 2. The flowchart illustrates the architecture, functionality, and operation of possible implementations of systems, methods, and computer program products according to various embodiments of the present disclosure. As described herein, a virtual 3D environment may be generated based on 360-degree scene images, and/or based on cube mapping. Process 400 illustrates an example process for generating cube maps (e.g., the cube maps 311 shown in FIG. 3) based on a 3D computer-generated model.

As shown in FIG. 4, process 400 may include receiving a 3D model (block 410). For example, the virtual environment generation sever 230 may receive a 3D model (such as the computer-generated 3D model 301) from a 3D modeling application or system (which may be hosted by the virtual environment generation sever 230 or externally of the virtual environment generation sever 230).

Figure 5:
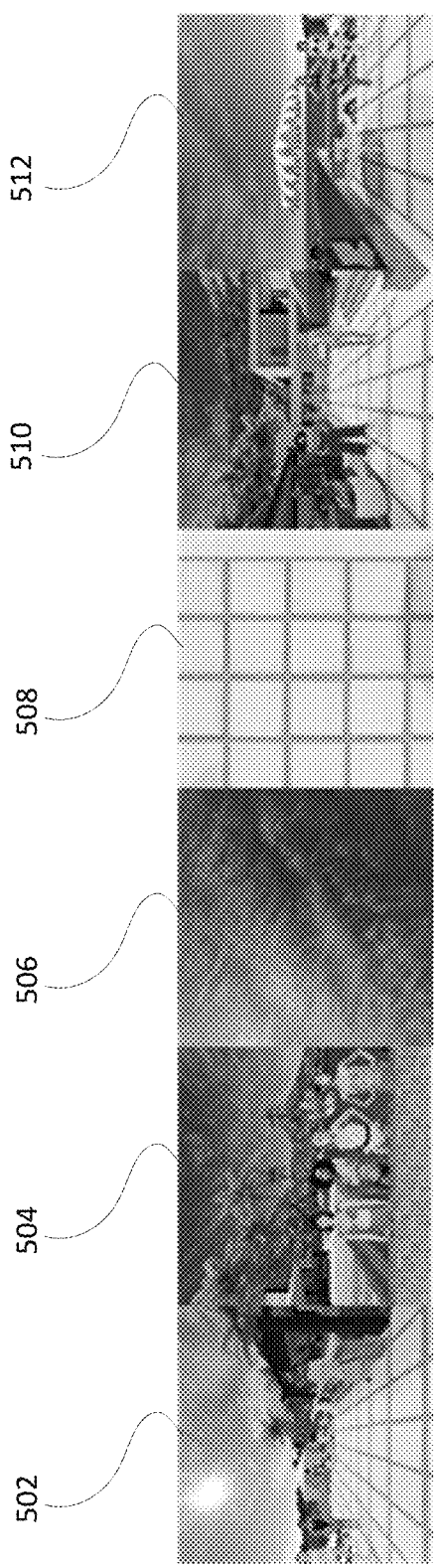
FIG. 5 illustrates example cube faces derived from a 3D model as part of generating a virtual 3D environment based on a 3D model.

Process 400 also may include creating multiple cube maps at different levels of resolution using the 3D model (block 420). For example, the virtual environment generation sever 230 may create multiple cube maps at different levels of resolution using the 3D model (e.g., received at block 410). As an illustrative example, the virtual environment generation sever 230 may create a cube map in the form of six faces of a cube in which the faces respectively represent a front view, top view, a bottom view, a right view, a left view, and a back view. The six faces together form a 360-degree view of a scene of the 3D model. An example of the six cube faces representing a cube map is shown in FIG. 5. For example, referring to FIG. 5, the virtual environment generation sever 230 may create cube faces 502, 504, 506, 508, 510, and 512 which together form a cube of a scene of the 3D model. In the example shown in FIG. 5, cube face 502 may be a front view, cube face 504 may be a back view, cube face 506 may be a top view, cube face 508 may be a bottom view, cube face 510 may be a right view, and cube face 512 may be a left view. The example shown in FIG. 5 may correspond to the 3D scene shown in FIG. 1A.

Returning to process block 420 of FIG. 4, the virtual environment generation sever 230 may form multiple cube maps to capture the entire 3D model. Further, the virtual environment generation sever 230 may form multiple cube maps at different levels of resolution (e.g., such that an appropriate resolution of the 3D environment may be presented based on network conditions). Example resolutions may be 1,000×1,000 pixels, 2,000×2,000 pixels, 4,000 by 4,000 pixels, or other resolution.

Process 400 further may include reducing each cube face at each level of resolution into multiple square images (block 430). For example, the virtual environment generation sever 230 may reduce each cube face at each level of resolution into multiple square images. As an example, the virtual environment generation sever 230 may reduce a cube face (e.g., split the cube face) into 64 images. In this example, the total number of images for one cube map (e.g., one scene) would be 6*64, or 384 images. The number of images and the resolution of the images may vary based on any variety of design and/or network considerations.

Process 400 also may include storing sets of the multiple square images (block 440). For example, the virtual environment generation sever 230 may store sets of the multiple images such that the images may be provided to the user (e.g., via the user device 210) in order to present the virtual 3D environment at appropriate resolutions. The stored sets of multiple square images may correspond to the cube maps 311 shown in FIG. 3. Thus, once the square images have been generated and stored, in accordance with process 400, the virtual 3D environment may be constructed in accordance with the processes described in FIG. 3.

Figure 6:
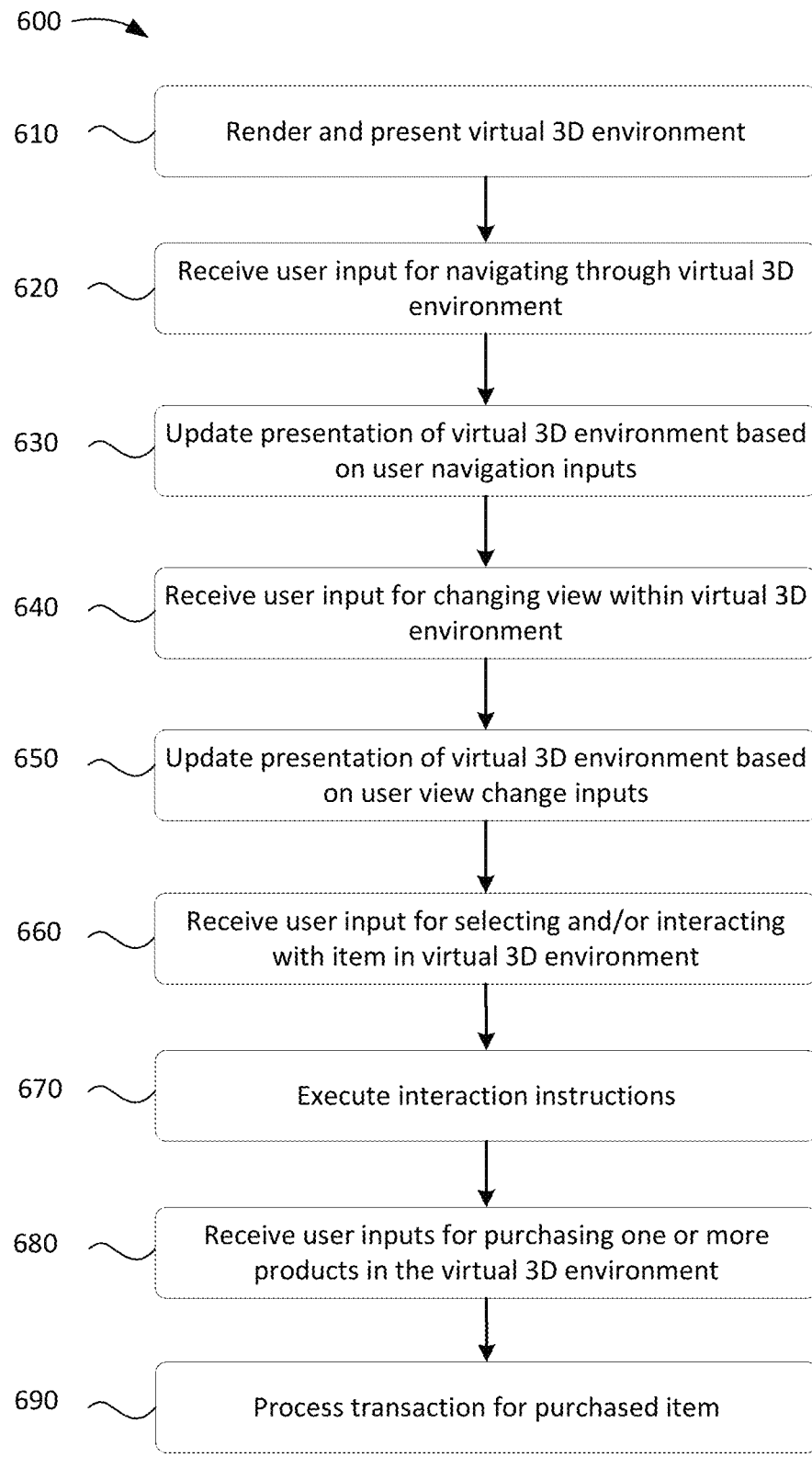
FIG. 6 illustrates an example flowchart of a process for presenting a virtual 3D environment to a user, navigating through the virtual 3D environment, facilitating interactions between the user and the virtual 3D environment, and facilitating transactions via the virtual 3D environment.

FIG. 6 illustrates an example flowchart of a process for presenting a virtual 3D environment to a user, navigating through the virtual 3D environment, facilitating interactions between the user and the virtual 3D environment, and facilitating transactions via the virtual 3D environment. The blocks of FIG. 6 may be implemented in the environment of FIG. 2, for example, and are described using reference numbers of elements depicted in FIG. 2. The flowchart illustrates the architecture, functionality, and operation of possible implementations of systems, methods, and computer program products according to various embodiments of the present disclosure.

As shown in FIG. 6, process 600 may include rendering and presenting a virtual 3D environment (block 610). For example, the virtual environment generation sever 230 may render and present the virtual 3D environment (e.g., constructed using the example process shown in FIG. 3). More specifically, the virtual environment generation sever 230 may provide images representing the virtual 3D model to the user device 210 (e.g., via an application, a web browser, or the like). In some embodiments, the virtual environment generation sever 230 may present the 3D virtual environment to the user device 210 based on receiving a request for the 3D virtual environment (e.g., when the user access an application that presents the 3D virtual environment, and/or browses to a web address or uniform resource locator (URL) of a web page presenting the virtual 3D environment). In some embodiments, the virtual environment generation sever 230 may identify a particular virtual 3D environment to present based on a user ID of the user. Additionally, or alternatively, the virtual environment generation sever 230 may identify the particular virtual 3D environment based on a user selection. Further, the virtual environment generation sever 230 may identify a resolution of the virtual 3D environment to present based on network conditions (e.g., network quality of communications between the user device 210 and the virtual environment generation sever 230). In some embodiments, the virtual environment generation sever 230 may present different portions of the virtual 3D environment at different resolutions (e.g., higher resolutions for higher priority portions of the virtual 3D environment).

As described herein, the user device 210 may present a scene of the 3D virtual environment, as well as products, objects, avatars, etc. in the scene. Further, the user device 210 may present navigation arrows to navigate to other scenes in the 3D virtual environment and/or interaction buttons to interact with various objects and/or products in the scene.

Process 600 also may include receiving user input for navigating through the virtual 3D environment (block 620). For example, the virtual environment generation sever 230 may receive user input to navigate through the virtual 3D environment. More specifically, the virtual environment generation sever 230 may receive a user input to navigate to another scene in the virtual 3D environment. As one illustrative example, the virtual environment generation sever 230 may receive user input in the form of a selection of a navigation arrow presented in the virtual 3D environment. Any variety of user inputs may be provided by the user (via the user device 210) to select the navigation arrow.

Process 600 further may include updating presentation of virtual 3D environment based on user navigation inputs (block 630). For example, the virtual environment generation sever 230 may update the presentation of virtual 3D environment based on user navigation inputs. More specifically, the virtual environment generation sever 230 may present a difference scene of the virtual 3D environment based on the user navigation inputs. For example, the scene corresponding to the navigation arrow that was selected (e.g., at block 620) may be presented to user device 210 (e.g., at an appropriate resolution based on network conditions). On example of navigating to another scene within the virtual 3D environment is shown in FIGS. 1A and 1B.

Process 600 also may include receiving user input for changing the view within the virtual 3D environment (block 640). For example, during presentation of the virtual 3D environment, the virtual environment generation sever 230 may receive user input (e.g., from the user device 210) to "look around" the virtual 3D environment (e.g., view the 3D virtual environment at different angles/points of views). Such user input may include keyboard/mouse input, voice input, touchscreen inputs, gesture inputs, and/or inputs form gyroscope implemented by the user device 210, position data from the user device 210 (e.g., when the user device 210 includes a virtual reality or augmented reality headset), etc. As an example, the user inputs may be used to "rotate" the point of view. Based on receiving these inputs, the virtual environment generation sever 230 may update the presentation of the virtual 3D environment to correspond to the different angles and points of views inputted by the user (e.g., as at block 650).

Process 600 also may include receiving a user input for selecting and/or interacting with an item in the virtual 3D environment (block 660). For example, the virtual environment generation sever 230 may receive a user input for selecting and/or interacting with an item in the virtual 3D environment. As one illustrative example, the virtual environment generation sever 230 may receive a user input that selects a button to interact with an object, avatar, product, etc. presented within the virtual 3D environment.

Process 600 further may include execute interaction instructions (block 670). For example, the virtual environment generation sever 230 may execute interaction instructions corresponding to the user input received at block 640. Example interaction instructions that may be executed include presenting additional information about a product, adding a product to a shopping cart, shopping list, and/or wish list, presenting a video regarding the product, viewing a product in 3D (e.g., when a 3D model of the product is available), etc. Additionally, or alternatively, the interaction instruction may include moving an item to another location within the virtual 3D environment. Examples of interactions that may be provided within the virtual 3D environment are shown in FIGS. 1E-1K.

Process 600 also may include receiving user inputs for purchasing one or more products in the virtual 3D environment (block 680). For example, the virtual environment generation sever 230 may receive user inputs for purchasing one or more products in the virtual environment. As one illustrative example, a selection of a product may present an option for the user to add the product to a virtual shopping cart (or immediately purchase the product and bypass the virtual shopping cart). Any variety of interfaces and/or user inputs may be implemented to facilitate the purchase of the one or more products presented in the virtual 3D environment.

Process 600 further may include processing a transaction for a purchased item (block 690). For example, the virtual environment generation sever 230 may process a transaction for a purchased item by communicating with a payment and/or transaction processing system. In some embodiments, the virtual environment generation sever 230 may forward the user to the payment and/or transaction processing system to complete the transaction. Additionally, or alternatively, the virtual environment generation sever 230 may collect transaction information and forward the transaction information to the payment and/or transaction processing system.

As described herein, the user may select which virtual environment they would like to shop. For the selected environment, a scene file and its associated navigation and product data is fetched (e.g., from the external data server 220 and/or the virtual environment generation sever 230). In some embodiments, the 360-degree scene file may be mapped onto the screen of the user device 210, and the rectangular area currently in view may be rendered. Navigation arrow buttons and product indicator buttons whose locations are within the currently viewed area of the scene may be displayed. In some embodiments, the user may view or look around each scene in 360 degrees using the following example process. On user device 210 (e.g., a smartphone), as the user moves the user device 210 around, the area currently in view may be continuously updated to simulate the feeling as if the user is looking around the virtual 3D environment using their user device 21 as a "magic window." A gyroscope device within the user device 210 may be used to determine which portion of the scene to show, corresponding with the position the user is holding their user device 210.

On a different type of user device 210 (e.g., a desktop machine), the user may provide user input via a mouse (e.g., by dragging the mouse to move the scene around). On a different type of user device 210 (e.g., a virtual reality or augmented reality headset), the user can move their head to update their visible area. In some embodiments, the user may navigate to other scenes in the virtual 3D environment by clicking on the navigation arrow buttons. Doing so may cause the virtual environment generation sever 230 to fetch the scene file and associated data, and repeat the rendering process accordingly. In some embodiments, the user may select on product buttons for any products that may be of interested. Selection of products may present a panel or window that displays additional information about the product, as well as options to purchase the product immediately, or save the product in a list (e.g., shopping list or wish lists) for purchase at a later time, or for sharing the product information with other users. In some implementations, using a mobile user device 210, the user may have the option to view the product in real life surroundings through a camera of the user device 210.

Figure 7:
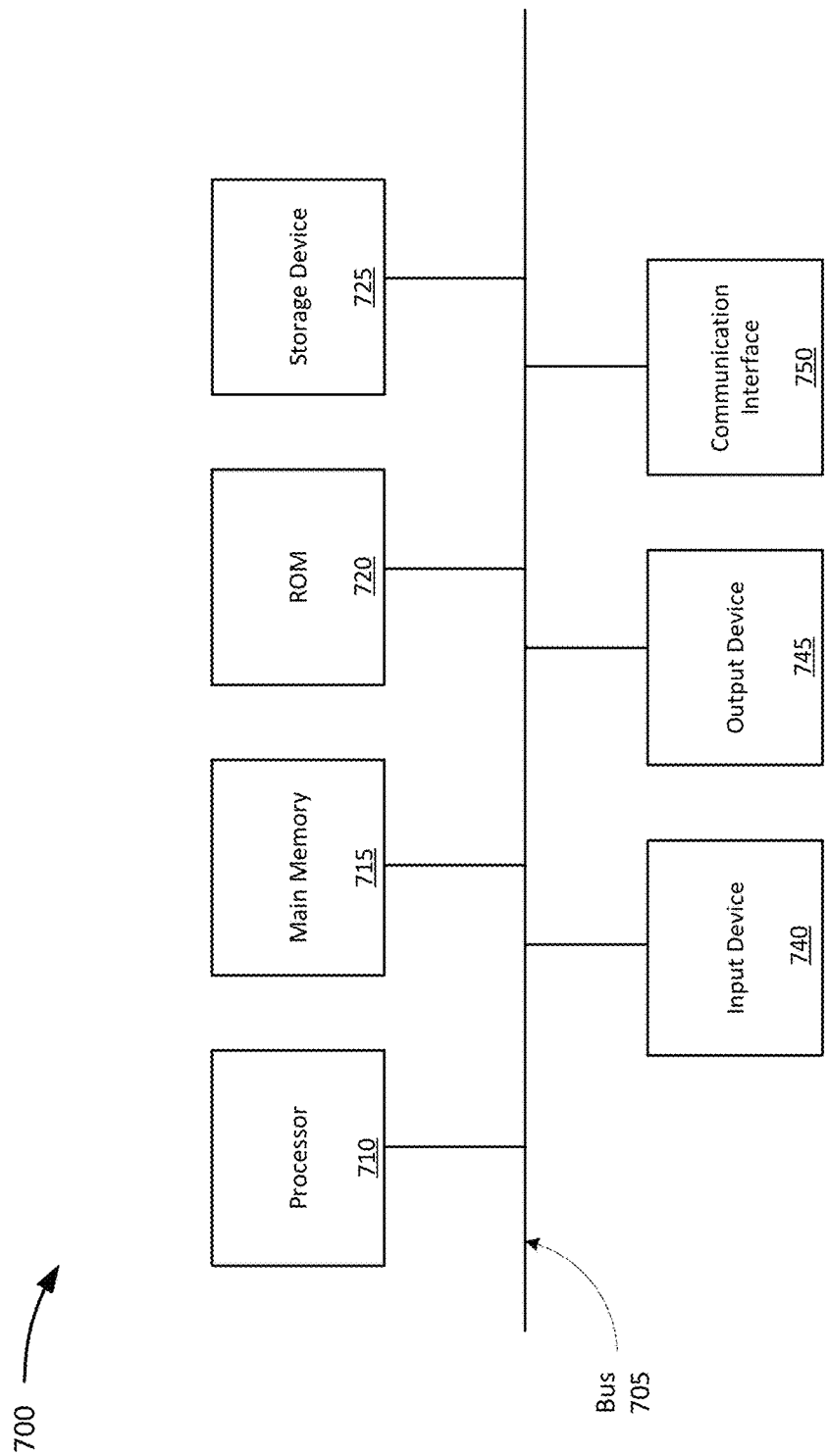
FIG. 7 illustrates example components of a device that may be used within environment of FIG. 2.

FIG. 7 illustrates example components of a device 700 that may be used within environment 200 of FIG. 2. Device 700 may correspond to user device 210, external data server 220, and/or virtual environment generation server 230. Each of user device 210, external data server 220, or virtual environment generation server 230 may include one or more devices 700 and/or one or more components of device 700.

As shown in FIG. 7, device 700 may include a bus 705, a processor 710, a main memory 715, a read only memory (ROM) 720, a storage device 725, an input device 740, an output device 745, and a communication interface 750.

Bus 705 may include a path that permits communication among the components of device 700. Processor 710 may include a processor, a microprocessor, an application specific integrated circuit (ASIC), a field programmable gate array (FPGA), or another type of processor that interprets and executes instructions. Main memory 715 may include a random access memory (RAM) or another type of dynamic storage device that stores information or instructions for execution by processor 710. ROM 720 may include a ROM device or another type of static storage device that stores static information or instructions for use by processor 710. Storage device 725 may include a magnetic storage medium, such as a hard disk drive, or a removable memory, such as a flash memory.

Input device 740 may include a component that permits an operator to input information to device 700, such as a control button, a keyboard, a keypad, or another type of input device. Output device 745 may include a component that outputs information to the operator, such as a light emitting diode (LED), a display, or another type of output device. Communication interface 750 may include any transceiver-like component that enables device 700 to communicate with other devices or networks. In some implementations, communication interface 750 may include a wireless interface, a wired interface, or a combination of a wireless interface and a wired interface. In embodiments, communication interface 750 may receiver computer readable program instructions from a network and may forward the computer readable program instructions for storage in a computer readable storage medium (e.g., storage device 725).

Device 700 may perform certain operations, as described in detail below. Device 700 may perform these operations in response to processor 710 executing software instructions contained in a computer-readable medium, such as main memory 715. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into main memory 715 from another computer-readable medium, such as storage device 725, or from another device via communication interface 750. The software instructions contained in main memory 715 may direct processor 710 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, device 700 may include additional components, fewer components, different components, or differently arranged components than are shown in FIG. 7.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may include a system, a method, and/or a computer program product at any possible technical detail level of integration. The computer program product may include a computer readable storage medium (or media) having computer readable program instructions thereon for causing a processor to carry out or execute aspects and/or processes of the present disclosure.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A computer-implemented method comprising:
   generating a cube map based on a computer-generated imagery (CGI) 3D model by:
      determining a plurality of viewing coordinates in the CGI 3D model corresponding to a plurality of different viewing positions;
      creating a plurality of cube face images representing a scene of the CGI 3D model at a viewing position of the plurality of different viewing positions; and
      dividing a cube face image of the plurality of cube face images into a plurality of reduced-size images;
   generating a virtual environment based on the cube map, wherein the virtual environment comprises the scene as one of a plurality of scenes based on the plurality of different viewing positions, and one or more products displayed within the scene, the virtual environment is presented using a user device;
   receiving user input, at the virtual environment, indicating a product of interest of the one or more products;
   determining a high priority portion of the cube map based on the user input indicating the product of interest; and
   rendering the high priority portion of the cube map at a higher resolution than another portion of the cube map.

2. The method of claim 1, further comprising:
   receiving user input for viewing the virtual environment at different angles and positions; and
   updating the virtual environment based on the user input to view the virtual environment at different angles and positions.

3. The method of claim 1, further comprising:
   receiving user input for navigating through the virtual environment; and
   updating the virtual environment based on the user input for navigating through the virtual environment.

4. The method of claim 1, further comprising:
   receiving user input to interact with an item in the virtual environment; and
   executing an interaction instruction based on receiving the user input to interact with the item.

5. The method of claim 1, further comprising:
   receiving user input for purchasing the one or more products; and
   processing, by a computing device, a purchase for the one or more products.

6. The method of claim 1, wherein generating the virtual environment comprises generating 360-degree scene images.

7. The method of claim 1 wherein the plurality of reduced-size images include a plurality of square images, and further comprising:
   storing, by the computing device, the plurality of square images with an association to the cube face image.

8. The method of claim 7, further comprising:
   determining a number of the plurality of square images into which the cube face image is divided based at least partly on a design of the computer-generated 3D model.

9. The method of claim 1, wherein the user input indicating the product of interest includes an interaction with an avatar presented within the virtual environment.

10. The method of claim 1, wherein the user input indicating the product of interest includes an indication of a product type preference.

11. A computer program product stored on a non-transitory computer readable storage medium having program instructions embodied therewith, the program instructions executable by a computing device to cause the computing device to perform operations comprising:
    obtaining a computer-generated imagery (CGI) 3D model;
    generating a cube map by:
       determining a plurality of viewing coordinates in the CGI 3D model corresponding to a plurality of different viewing positions;
       creating a plurality of cube face images from the computer-generated 3D model representing a scene of the CGI 3D model at a viewing position of the plurality of different viewing positions;
    dividing a cube face image of the plurality of cube face images into a plurality of reduced-size images;
    receiving product data of one or more products;
    receiving scene-by-scene navigation arrow coordinates;
    receiving scene-by-scene product indicator coordinates;
    receiving interaction data;
    generating a virtual 3D environment based on:
       the cube map,
       the plurality of reduced-size images,
       the product data,
       the scene-by-scene navigation arrow coordinates,
       the scene-by-scene product indicator coordinates, and
       the interaction data,
    wherein the virtual 3D environment comprises:
       one or more scenes,
       one or more products displayed within the one or more scenes at locations indicated by the scene-by-scene product indicator coordinates; and
       one or more navigation arrows displayed at locations indicated by the scene-by-scene navigation arrow coordinates;
    presenting the virtual 3D environment to a user via a user device;
    receiving a user input to change a view within the virtual 3D environment;
    receiving a user input to navigate through the virtual 3D environment based on a selection of the one or more navigation arrows;
    updating the virtual 3D environment based on the receiving the user input to change a view within the virtual 3D environment or the user input to navigate through the virtual 3D environment;
    receiving user input to interact with an item in the virtual 3D environment;
    determining, based on the user input to interact with the item, a product of interest associated with a user;
    determining a high priority portion of the cube map based on the user input to interact with the item; and
    rendering the high priority portion of the cube map at a higher resolution than another portion of the cube map.

12. The computer program product of claim 11, wherein generating the virtual 3D environment is further based on user data.

13. The computer program product of claim 11, wherein the CGI 3D model is constructed based on:
   a 3D layout;
   materials information;
   lighting information; and
   product images.

14. The computer program product of claim 11, wherein the operations further comprise generating different versions of the virtual 3D environment at different resolutions.

15. The computer program product of claim 14, wherein presenting the virtual environment comprises presenting a particular resolution of the virtual 3D environment based on network conditions.

16. The computer program product of claim 11, wherein presenting the virtual environment comprises presenting a particular version of the virtual 3D environment based on user information.

17. The computer program product of claim 11, wherein the instructions corresponding to the user input to interact with the item comprise at least one of:
   presenting textual information about the item;
   presenting additional images of the item;
   presenting a video regarding the item;
   adding the item to a shopping cart;
   adding the item to a list;
   purchasing the item;
   viewing a 3D version of the item; or
   moving the item.

18. The computer program product of claim 11, wherein the user input to change the view, navigate through the virtual 3D environment, or interact with the item comprise at least one of:
   keyboard/mouse input;
   voice input;
   touchscreen input gesture input;
   gyroscope input; or
   device position and orientation input.

19. A computer-implemented method comprising:
   obtaining, by a computing device, a computer-generated imagery (CGI) 3D model having a scene;
   creating, by the computing device, a cube map of the scene, wherein creating the cube map comprises:
      determining a plurality of viewing coordinates in the CGI 3D model corresponding to a plurality of different viewing positions;
      creating a plurality of cube face images, the plurality of cube face images representing the scene at a viewing position of the plurality of viewing positions, a cube face image of the plurality of cube face images being divided into a plurality of reduced-size images;
   storing, by the computing device, the plurality of reduced-size images corresponding to the cube face image;
   generating an interactive virtual 3D shopping environment by presenting the cube map of the scene as one of a plurality of scenes based on the different viewing positions;
   receiving user input, at the interactive virtual 3D shopping environment, indicating a product of interest;
   determining a high priority portion of the cube map based on the user input indicating the product of interest; and
   rendering the high priority portion of the cube map at a higher resolution than another portion of the cube map.

20. The method of claim 19, wherein the interactive virtual 3D shopping environment is navigable, viewable in 360-degrees, and comprises user interactable and purchasable items.

* * * * *